(12) United States Patent
Smith, III (10) Patent No.: US 7,219,932 B2
(45) Date of Patent: May 22, 2007

(54) JUNCTION PLATE FOR SUBSEA HYDRAULIC COUPLINGS

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 180 days.

(21) Appl. No.: 10/826,883

(22) Filed: Apr. 16, 2004

(65) Prior Publication Data

US 2005/0230970 A1      Oct. 20, 2005

(51) Int. Cl.
*F16L 39/00*      (2006.01)

(52) U.S. Cl. ............ 285/124.3; 285/920; 285/38; 285/396

(58) Field of Classification Search ........... 285/124.3, 285/920, 38, 314, 124.2, 396, 29
See application file for complete search history.

(56) References Cited

U.S. PATENT DOCUMENTS

| | | | | |
|---|---|---|---|---|
| 2,350,492 A | * | 6/1944 | Carpenter | 285/121.5 |
| 2,795,985 A | * | 6/1957 | Wilson et al. | 285/920 |
| 3,526,417 A | * | 9/1970 | Aumiller | 285/38 |
| 4,694,859 A | | 9/1987 | Smith, III | 137/614.04 |
| 4,900,071 A | | 2/1990 | Smith, III | 285/379 |
| 4,915,419 A | | 4/1990 | Smith, III | 285/26 |
| 5,265,980 A | | 11/1993 | Lugo et al. | 405/169 |
| 5,284,183 A | | 2/1994 | Smith, III | 137/614.04 |
| 5,607,143 A | * | 3/1997 | Regal | 254/342 |
| 6,375,153 B2 | | 4/2002 | Smith, III | 251/149.7 |
| 6,471,250 B2 | * | 10/2002 | Smith, III | 285/124.1 |
| 6,595,552 B1 | * | 7/2003 | Mortari | 285/24 |
| 6,626,207 B1 | | 9/2003 | Smith, III | 137/614.03 |
| 6,805,382 B2 | * | 10/2004 | Jennings | 285/18 |
| 2005/0212286 A1 | | 9/2005 | Smith, III | 285/124.1 |

FOREIGN PATENT DOCUMENTS

| | | |
|---|---|---|
| DE | 31 41 489 A1 | 5/1983 |
| GB | 2 372 303 | 8/2002 |

* cited by examiner

*Primary Examiner*—David Bochna
(74) *Attorney, Agent, or Firm*—Wong, Cabello, Lutsch, Rutherford & Brucculeri, LLP (57) ABSTRACT

A junction plate assembly for subsea hydraulic couplings has gear-driven cam followers on the circumference of one, generally circular, junction plate and curved cam tracks on a corresponding junction plate to urge the plates together or apart. The gears can provide significant mechanical advantage in moving the junction plates. Accordingly, larger junction plates with a greater number of hydraulic coupling members may be joined together when using the apparatus of the invention. The mechanical advantage provided by the junction plate mechanism allows the use of smaller, less powerful Remotely Operated Vehicles (ROVs) to make hydraulic connections in the subsea environment.

14 Claims, 6 Drawing Sheets

JUNCTION PLATE FOR SUBSEA HYDRAULIC COUPLINGS

BACKGROUND OF THE INVENTION

1. Field of the Invention

This invention concerns hydraulic couplings used in subsea oil and gas well applications. More particularly, it relates to junction plates used to simultaneously mate a plurality of male and female hydraulic couplings.

2. Description of the Related Art

Offshore oil and gas exploration and production involves the placement of numerous valves and safety equipment on or near the sea floor. The collection of such equipment on a well is often referred to as a "tree." Frequently, these devices are hydraulically actuated from a remote location such as a production platform. A bundle of hydraulic lines, known as an umbilical cable, is routed from a control panel on the platform to the subsea tree. For ease of assembly and maintenance, subsea hydraulic couplings are typically provided for joining the hydraulic lines to the tree. Examples of such subsea hydraulic couplings are disclosed in U.S. Pat. No. 4,694,859 and U.S. Pat. No. 6,626,207 and U.S. Pat. No. 6,375,153.

Because such couplings must be mated underwater by divers or remotely operated vehicles ("ROVs"), it has been found that the mating process may be expedited by placing a plurality of couplings on opposing junction plates. The junction plates hold the couplings in position and are provided with means for securing the two plates in proximity one to another so as to maintain the individual couplings in a connected condition. Since the hydraulic lines may be pressurized with hydraulic fluid at or about 17,500 psi, the junction plates must be able to withstand the force of the hydraulic fluid acting on the male members as they are inserted into the receiving chambers of the female members and the poppet valves open to allow the flow of hydraulic fluid. It is accordingly necessary to provide some means of mechanical advantage to bring the plates into the fully coupled position.

Male or female couplings may be provided on either plate, but it is typical to locate the male couplings on the fixed plate and the female couplings on the removable plate because the female couplings most often contain the sealing elements and it facilitates the replacement of those sealing elements by having them on a recoverable device—i.e., the plate holding the female members may be brought to the surface for maintenance operations.

A variety of subsea hydraulic couplings are known in the art. The couplings generally consist of a male member and a female member with connecting, sealed, fluid passageways. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling.

The male member includes a cylindrical body with a probe section approximately equal to the diameter of the female member bore, and a connection at its other end to facilitate connection to hydraulic lines. When the probe section of the male member is inserted into the bore of the female member, according to various embodiments of the device, fluid flow is established between the male and female members.

A male member and female member are generally connected to opposing junction plates of a manifold and are held together by bolts or hydraulic members attached to the plates. The male member is commonly attached to one junction or manifold plate, while the female member is attached to an opposing plate so as to face the male member and align with it. The male and female members may be attached to the junction plates or manifold plates using various means, such as set screws or threads. Techniques for attaching the members to such plates are well known to those skilled in the art.

Typically, several subsea hydraulic connectors are grouped together on each junction or manifold plate. For example, two or more coupling members may be attached to each opposing plate. In the subsea environment, a diver or remotely operated vehicle is used to connect the opposing plates together, and thereby connect the opposing coupling members on each of the plates. The coupling members are typically simultaneously connected and the opposing plates are locked together.

High separational forces are transferred to the opposing junction plates, due to the separational forces of the high-pressure hydraulic fluid in each coupling member—the male member acting as a piston within the cylinder of the female member. In many cases, the plates must be relatively thick and heavy in order to withstand high separational forces. The plates are typically stainless steel and between one and one and one-half inches in thickness.

The prior art describes various means for joining two junction plates. For example, U.S. Pat. No. 5,265,980 describes a junction plate assembly for a subsea structure having a connector shaft with external acme threads which mates with an internally threaded second junction plate. A handle is connected to an opposite end of the shaft for rotating the shaft by hand. Alternatively, the shaft may be equipped with a connection for an ROV.

U.S. Pat. No. 4,915,419 to Robert E. Smith III relates to a sliding lock plate for simultaneously locking together male and female coupling members on opposing junction plates. Various other locking devices have been used or proposed for the purpose of locking together the male and female coupling members attached to junction plates. These locking devices lock the coupling members together after the male end coupling members are fully engaged, and do not assist in bringing the male and female members together into full engagement before locking. In many cases, substantial axial forces are needed to bring all the male coupling members on a junction plate into full engagement with the corresponding female coupling members on the opposing junction plate. Hydraulic systems at subsea depths are subject to a number of different forces tending to inhibit the connection of male and female coupling members. For example, the hydrostatic pressures encountered at significant ocean depths, high hydraulic pressure in the system, and mechanical forces required to connect junction plates are among the factors of concern. A combination of these forces may result in difficulty simultaneously engaging the male and female coupling members on opposing junction plates, and also result in substantial separational forces after the coupling members are connected.

For operational simplicity, it is often desirable to have a plurality of hydraulic coupling members on a junction plate assembly. However, for the reasons discussed above, as the number of coupling members increases, so does the force required to bring the junction plates together into the fully mated condition. Using the junction plate devices of the prior art, larger, more powerful (and hence more costly) ROVs are needed when more couplings are added. What is needed is a junction plate assembly that provides significant mechanical advantage in the joining operation.

Attempts have been made to simultaneously bring the junction plates together, including threaded devices. However, threaded connections have the disadvantages of marine growth buildup in the threads and galling of the threads. Another alternative for bringing together subsea hydraulic connectors is lock sleeves. However, lock sleeves are relatively heavy and bulky, which is undesirable in the subsea environment. Other problems are caused by a buildup of silt, ocean debris and marine growth in the lock sleeves. Typically, the lock sleeve systems includes lock sleeves connected to a plate interposed between the male and female junction plates. As the intermediate plate is pulled back, all of the lock sleeves on the coupling members are simultaneously pulled back and then released. The buildup of silt, ocean debris and marine growth may result in jamming the lock sleeves and especially the locking balls.

U.S. Pat. No. 6,471,250 discloses a junction plate assembly for undersea hydraulic couplings that uses a sloped cam surface on one of the junction plates and a central shaft having a cam follower that moves up the sloped cam surface to bring the two junction plates together. U.S. patent application Ser. No. 10/806,661 which is commonly assigned to National Coupling Co., Inc. discloses a similar apparatus wherein paired cam surfaces and cam followers permit both a "cam on" and "cam off" functionality.

One shortcoming of the junction plate mechanism disclosed in U.S. Pat. No. 6,471,250 is that the mechanical advantage afforded by the device is dictated by the length and height of the sloped cam surface. The height of the sloped cam surface is determined by the make-up travel of the hydraulic couplings mounted on the junction plate. The length of the cam surface is limited by the arc between the two ends of the entrance slot for the arm or lower member supporting the cam follower(s). In a preferred embodiment having two, opposed cam surfaces, this arc is limited to about 120 degrees. Another shortcoming of this apparatus is that it only provides mechanical advantage for bringing the junction plates closer to one another; no mechanical assist is available for separating the plates—i.e., disconnecting the couplings mounted thereon.

Accordingly, what is needed is a mechanism for moving junction plates in the subsea environment both together and apart which offers a high degree of mechanical advantage. The present invention solves this problem.

SUMMARY OF THE INVENTION

The present invention employs gear-driven cam followers on one junction plate and curved cam tracks on a corresponding junction plate to urge the plates together or apart. The gears can provide significant mechanical advantage in moving the junction plates. Accordingly, larger junction plates with a greater number of hydraulic coupling members may be joined together when using the apparatus of the invention. The mechanical advantage provided by the junction plate mechanism allows the use of smaller, less powerful Remotely Operated Vehicles (ROVs) to make hydraulic connections in the subsea environment. Substantial cost savings can thereby be realized.

DETAILED DESCRIPTION

The invention can best be understood by reference to the accompanying drawings. The drawings comprise three pairs of figures. The first member of the pair (the odd-numbered drawings) is a top plan view of two, mated junction plates according to the present invention. The second member of each pair (the even-numbered drawings) is a corresponding cross-sectional view. The drawings progressively show the junction plates being moved into the fully-engaged position.

Hydraulic coupling junction plates are typically used in fixed/removable pairs—i.e., one junction plate is in a fixed position (e.g., on a subsea oil well tree) and one plate can be removed from engagement with the fixed plate. It is common practice to mount the male hydraulic coupling members on the fixed plate and the female coupling members on the removable junction plate. Since the seal elements are typically in the female coupling members, having them on the removable junction plate facilitates the replacement of worn or damaged seals since they can be brought to the surface with the removable junction plate. Examples of hydraulic coupling members which may be used on the junction plates of the present invention are described in U.S. Pat. Nos. 4,694,839; 4,900,071; 5,284,183; and, 6,375,153 all to R. E. Smith III.

Figure 1:
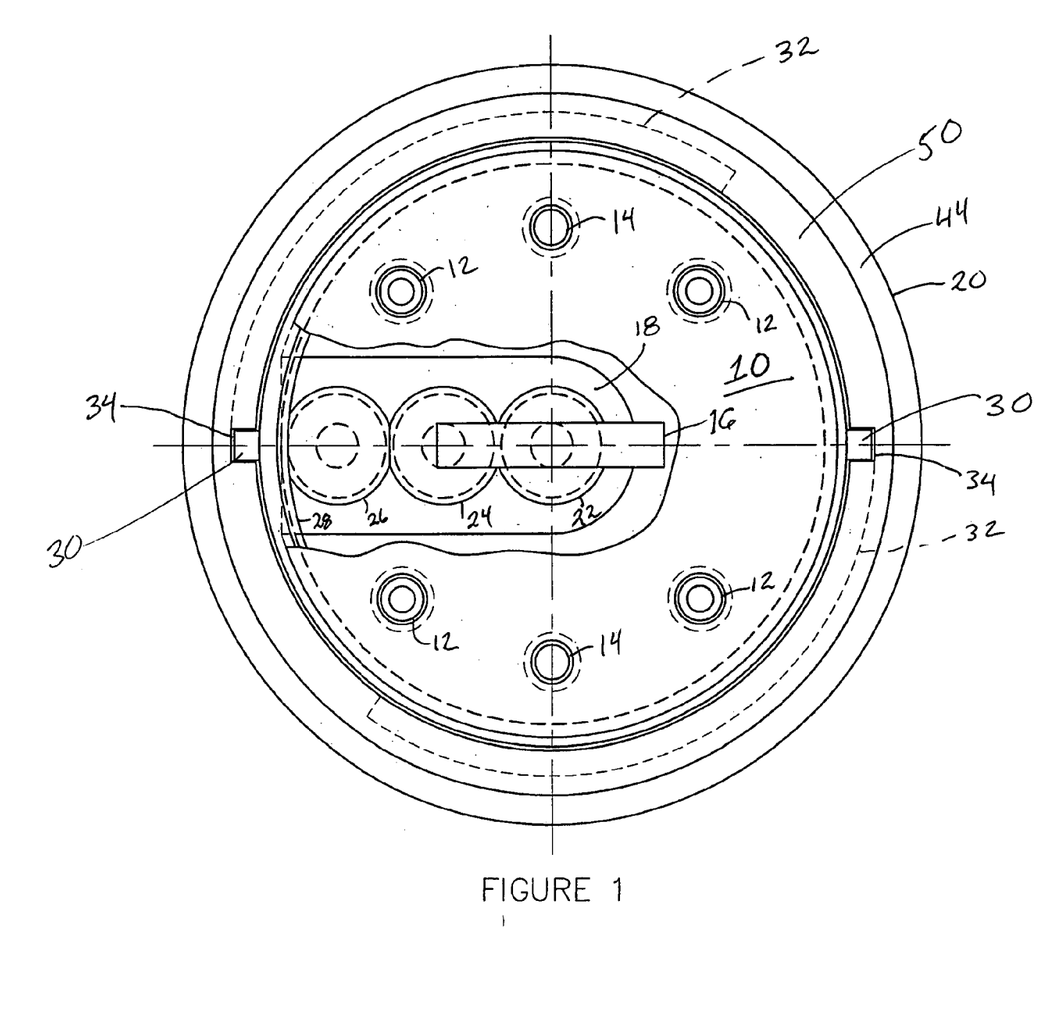
FIG. 1 is a partially cut-away, top or front plan view of a pair of junction plates according to one embodiment of the invention. The junction plates are shown in the insertion/removal position with the cam followers in the entrance slots of the cam tracks.
Figure 2:
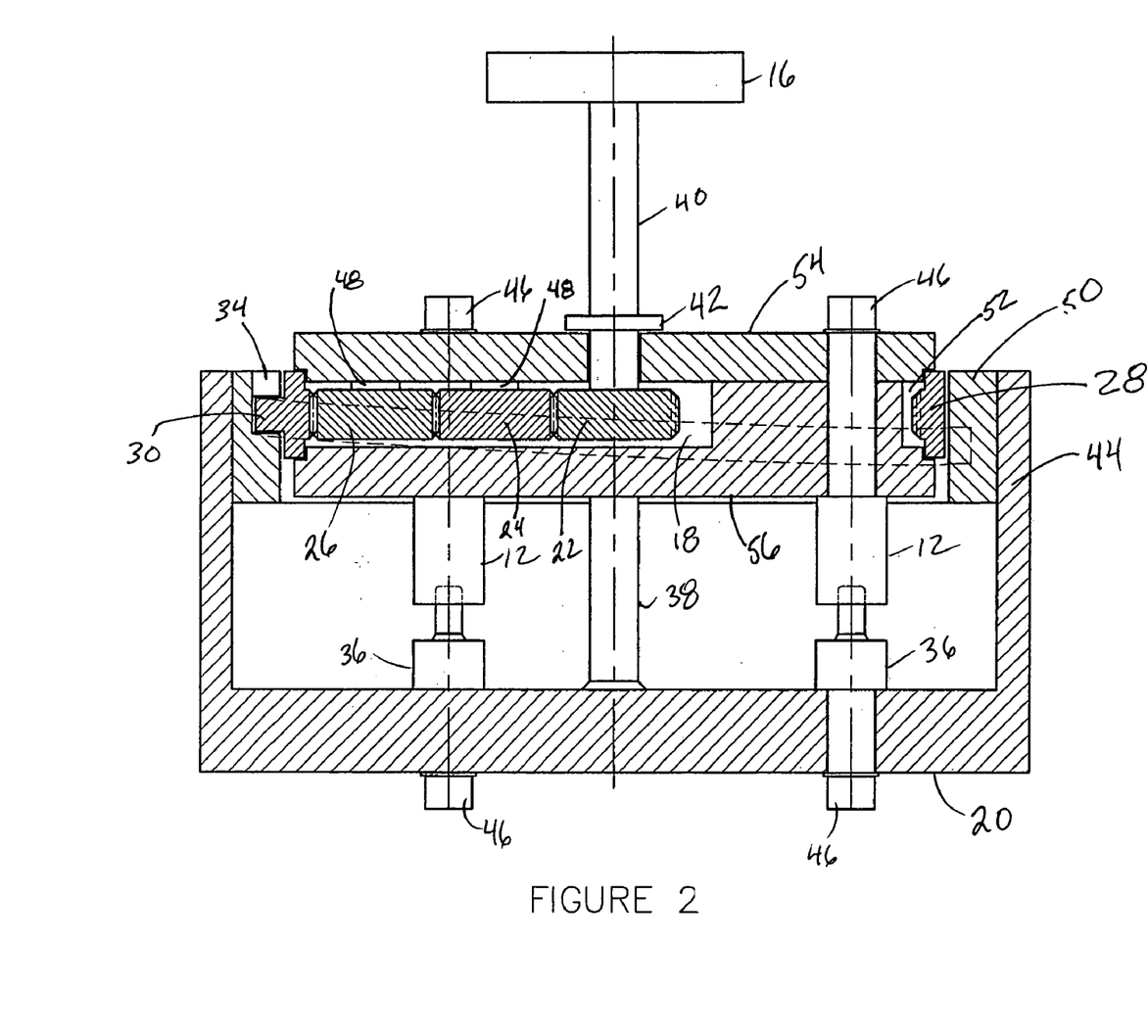
FIG. 2 is a cross-sectional view of the junction plates illustrated in FIG. 1.

In FIGS. 1 and 2, removable junction plate 10 is shown in initial engagement with fixed junction plate 20. Female hydraulic coupling members 12 are mounted to removable plate 10 and male hydraulic coupling members 36 are shown mounted to fixed plate 20. It will be appreciated by those skilled in the art that the mating halves of each hydraulic coupling may be mounted to either plate.

Figure 3:
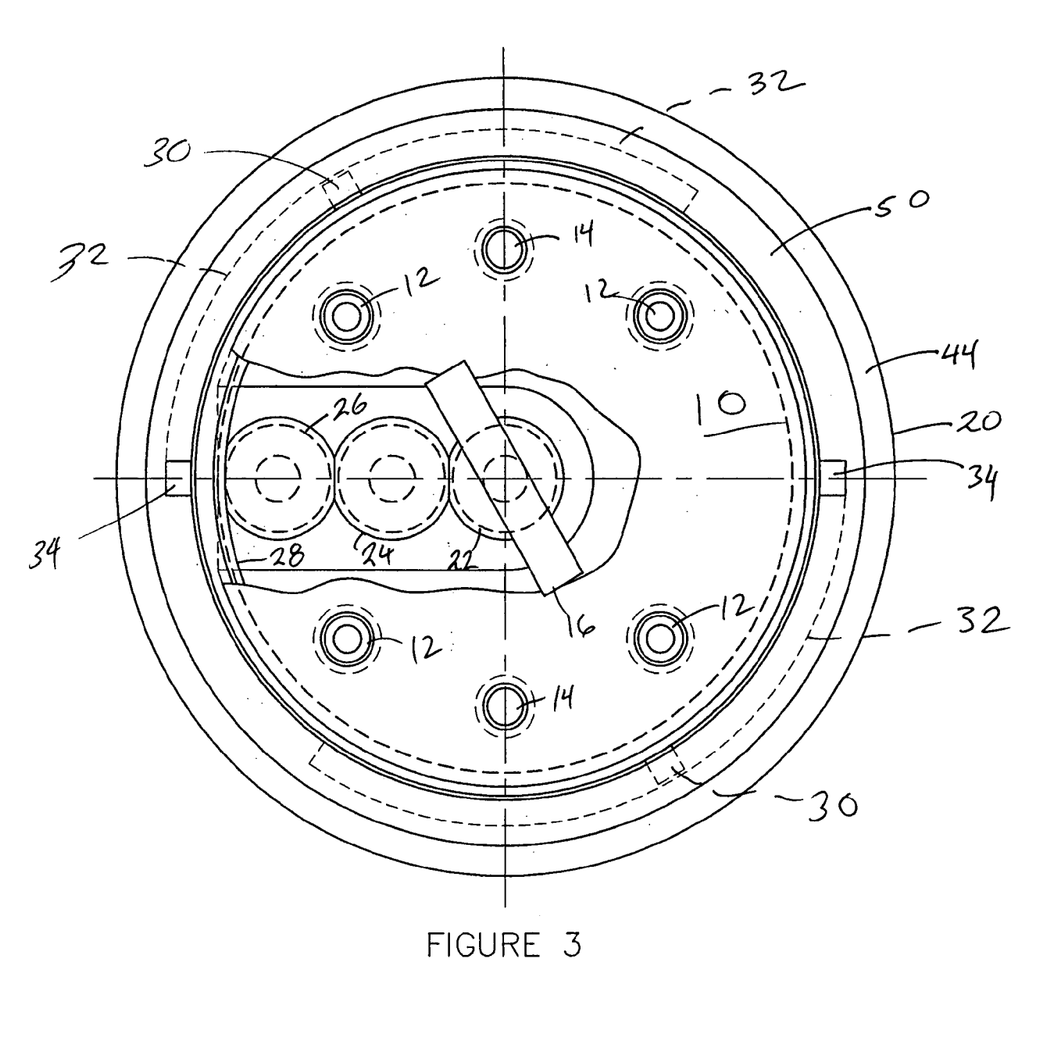
FIG. 3 is a partially cut-away, top or front plan view of a pair of junction plates according to the embodiment of FIG. 1. The junction plates are shown approximately half way between the insertion/removal position and the fully made up position.
Figure 4:
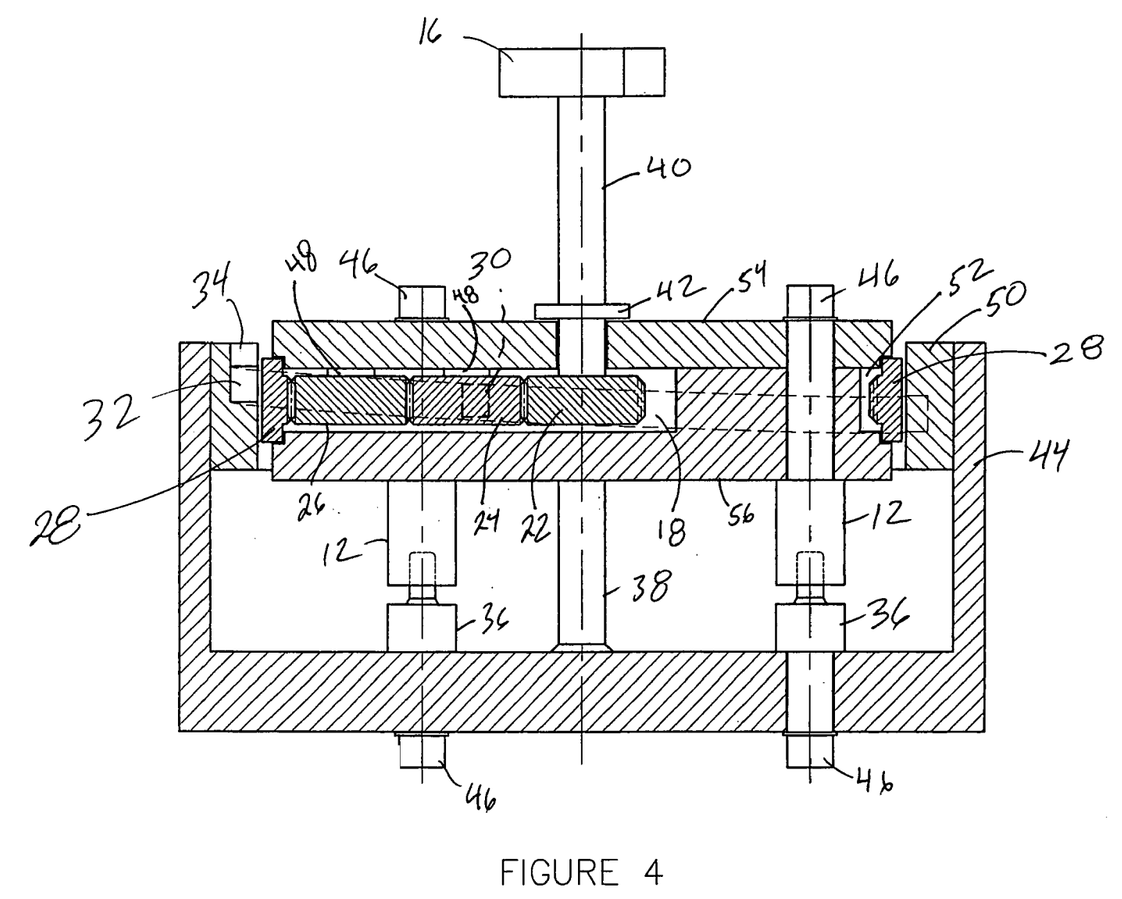
FIG. 4 is a cross-sectional view of the junction plates illustrated in FIG. 3.
Figure 5:
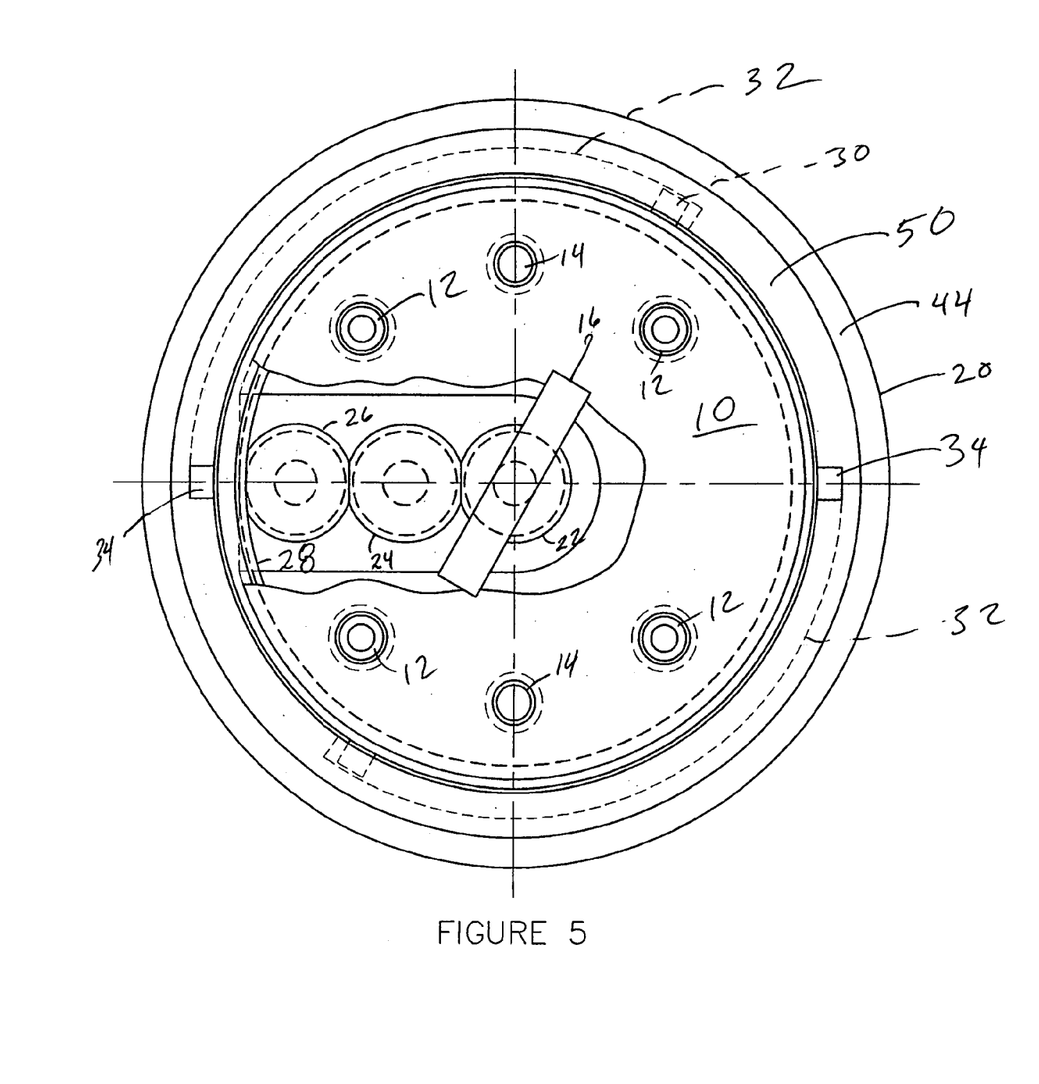
FIG. 5 is a partially cut-away, top or front plan view of a pair of junction plates according to the embodiment of FIG. 1. The junction plates are shown in the fully made up position.

Also shown in FIGS. 1, 3 and 5 are guide pin receptacles 14 which may comprise an appropriately sized hole through plate 10. Guide pin 38 may be seen in FIGS. 2, 4 and 6. When plates 10 and 20 are engaged, guide pins 38 are slideably inserted into guide pin receptacles 14 to provide alignment of the junction plates and to counteract the torque which may be experienced by the junction plates as cam followers 30 move in cam tracks 32. The length of guide pins 38 is preferably selected to be sufficient to align the plates prior to engagement of the hydraulic coupling pair members. In this way, the hydraulic couplings 12, 36 are aligned prior to contacting one another as the junction plates are brought together thereby avoiding damage to the couplings which can be caused by misalignment. It is preferable to mount at least one of the hydraulic coupling members in a manner which permits some radial "play" so that the coupling members are able to self-align as the male member enters the female member.

Guide pins 38 and/or guide pin receptacles 14 may also be configured to limit the travel of the junction plates. It is sometimes desirable to prevent the probe of the male coupling member from contacting the terminus of the receiving chamber of the female coupling member. By way of example, guide pins 38 may include a shoulder (not shown) which contacts the surface of the opposing junction plate and prohibits further travel of the plate in the joining direction. In yet another exemplary embodiment, guide pin receptacles 14 may comprise a close-ended hole such that when guide pins 38 reach the closed end of the receptacle 14, further travel of the junction plates is inhibited. It will be appreciated by those skilled in the art that the travel of the junction plates of the present invention is ordinarily limited by the position and length of the cam tracks 32. However, providing other means for limiting the travel of the junction plates enables the use of a junction plate assembly with hydraulic coupling members having a shorter make up without altering the profile or length of the cam track 32.

Figure 6:
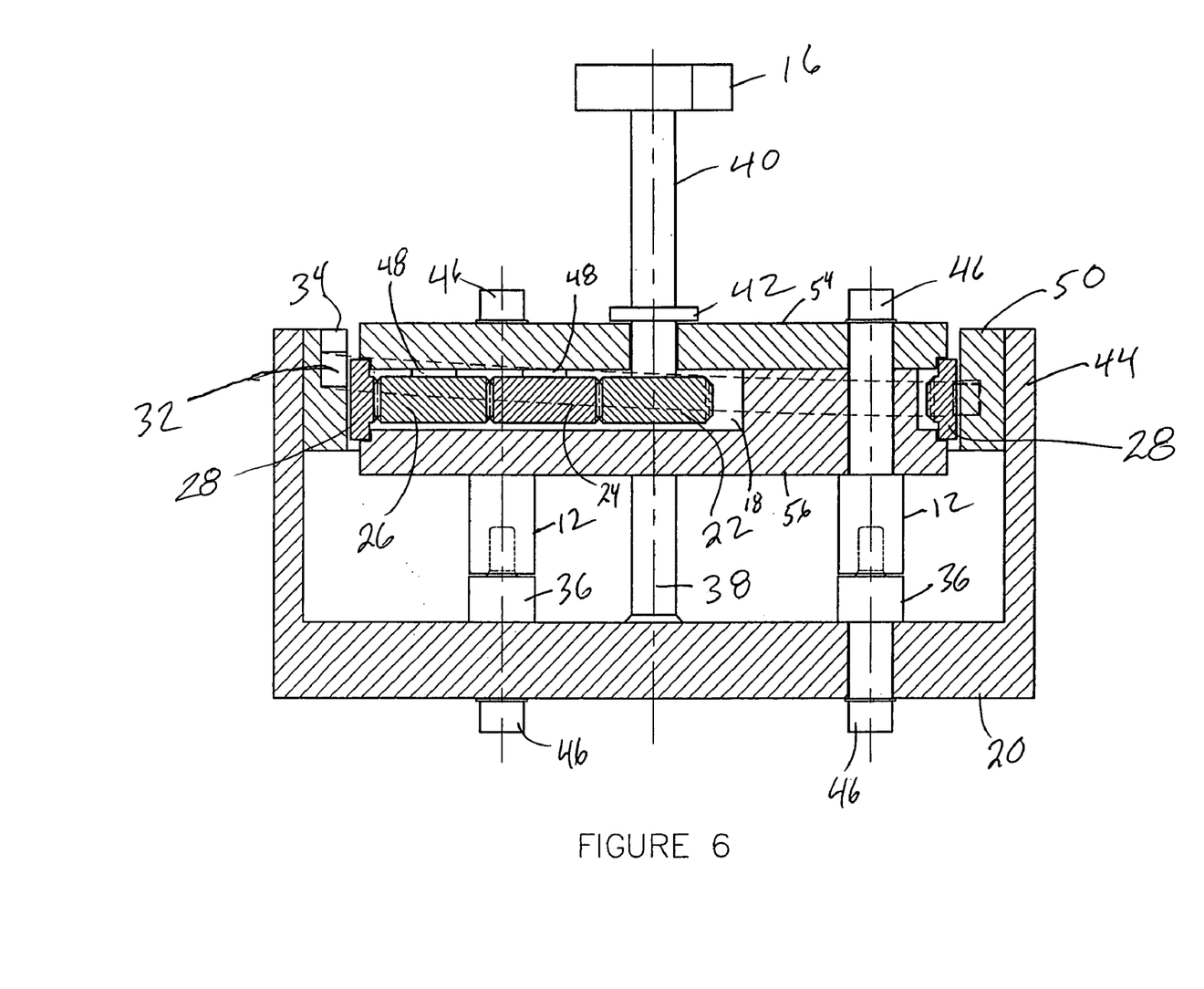
FIG. 6 is a cross-sectional view of the junction plates illustrated in FIG. 5.

As may be best seen in FIGS. 2, 4 and 6, removable junction plate 10 in the illustrated embodiment is comprised of top member 54 and lower member 56. Lower member 56 includes U-shaped cavity 18 which may be filled with grease or other gear lubricant. Handle 16 is attached to shaft 40 which forms the axis of driver gear 22. Shaft 40 may be secured to top member 54 with collar 42. Idler gear 24 and driven gear 26 are mounted on gear bearing shafts 48—gears 22, 24 and 26 making up a drive mechanism. Lower member 56 includes circumferential groove 52 into which cam carrier 28 fits. One or more cam followers 30 are attached to a cam carrier 28 which, in the illustrated embodiment is a ring gear. Alternatively, cam followers 30 may be formed integrally with ring gear 28. Cam followers 30 may comprise roller elements to reduce friction between the cam followers 30 and cam tracks 32. If multiple cam followers are employed, it is preferable that they be equally spaced around the circumference of removable junction plate 10 so that the joining and parting forces imparted to the junction plate do not act to tilt the plate when it is installed or removed. For this reason, it is preferable that at least two cam followers 30 be used although the invention could be practiced with a single cam follower.

Fixed junction plate 20 includes cylindrical wall section 44 which supports cam track carrier 50. Cam track(s) 32 are machined or otherwise formed in cam track carrier 50. At the end of each cam track 32, proximal the insertion end of junction plate 20, an entrance slot 34 is provided for cam follower(s) 30. Entrance slot 34 is contiguous with cam track 32. In some embodiments, a mechanical stop may be provided in the gear train (or elsewhere) to provide a positive insertion/withdrawal position for the cam follower(s) 30—i.e., if cam actuator 16 is turned until this limit is reached, the cam follower(s) 30 will be aligned with entrance slot(s) 34 when guide pins 38 are aligned with guide pin receptacles 14.

Each of hydraulic coupling members 12 and 36 may include connector 46 for attachment to an hydraulic fluid line or hose (not shown). In the illustrated embodiment, connectors 46 are internally threaded connectors. Other connection means are well known in the art.

In the illustrated embodiment, handle 16 is a T-handle—a configuration which has been found to be particularly convenient for both divers and ROVs to manipulate. Alternatively, handle 16 may be in the form of a crank, a knob or a wheel. When using ROVs to join the junction plates of the present invention, still other handle configurations may be employed. For example, handle 16 may comprise a hex nut adapted for engagement with a hex socket on a rotary-motion arm of an ROV. In still other embodiments, handle 16 could comprise a square-drive, hex or Torx™ receiver. Removable junction plate 10 may additionally be equipped with handles for manual manipulation and/or engagement points for ROV manipulation. The T-handle provides both functions.

The number and configuration of gears in the gear train may be varied to provide the desired mechanical advantage. Increasing the gear ratio, for example by configuring driver gear 22 with a smaller diameter than that of idler gear 24, will provide increased mechanical advantage but require a greater number of turns of handle 16 to cause cam follower(s) 30 to fully traverse cam track(s) 32.

In other situations, for example when a quick make up of the hydraulic couplings is required, it may be advantageous to provide an "overdrive" gear train configuration—i.e., a gear configuration wherein a revolution of handle 16 produces more than one revolution of driven gear 26.

Those skilled in the art will appreciate that it is not necessary that the axes of the gears in the gear train be collinear. Offset axes may be used to accommodate the number and size of gears desired. Similarly, the size and configuration of cavity 18 may be varied to provide the needed space for the gears selected.

In the embodiment illustrated in the drawing figures, a gear train is used to transfer the rotary motion of handle 16 and shaft 40 to ring gear 28 and cam followers 30. Many other drive mechanisms for transferring this motion could be employed. For example, toothed or cogged belts, drive shafts, chain and sprocket combinations and the like could be used in place of the illustrated gears. In perhaps the simplest embodiment, the end of shaft 40 opposite handle 16 could be connected to a rod or bar which terminates at each end in a cam follower 30. In such an embodiment, the only mechanical advantage provided would be that due to the pitch or slope of cam tracks 32.

The process of making up hydraulic couplings using the present invention will now be described with reference to the sequence of drawing figures. It will be understood that the process of disconnecting hydraulic couplings is simply the reverse of this process.

Referring now to FIGS. 1 and 2, removable junction plate 10 is seen to be in the initial or insertion position. Cam followers 30 are in entrance slots 34. Guide pin 38 is engaged in guide pin receptacle 14. Male coupling members 36 have been aligned with female coupling members 12 and the male probes of male coupling members 36 are partially within the receiving chambers of female members 12. However, if the preferred coupling members are used (such as those disclosed in U.S. Pat. No. 6,375,153 to R. E. Smith III) and the height of wall section 44 is appropriately selected, this degree of insertion is not sufficient to open the poppet valves within the coupling members and thus the junction plates 10 and 20 can be maintained in this position indefinitely without the loss of hydraulic fluid through the coupling members.

Referring now to FIGS. 3 and 4, handle 16 has been rotated sufficiently to cause cam followers 30 (shown in phantom) to move approximately half way along cam tracks 32 (also shown in phantom). As may be best seen in FIG. 4, this has caused removable junction plate 10 to move closer to fixed junction plate 20 such that the hydraulic coupling members 12, 36 are approximately half made up.

Referring now to FIGS. 5 and 6, handle 16 has been rotated sufficiently to cause cam followers 30 (shown in phantom) to move to near the terminus of each cam track 32 (also shown in phantom). As may be best seen in FIG. 6, this has caused removable junction plate 10 to move still closer to fixed junction plate 20 such that the hydraulic coupling members 12, 36 are now fully made up—preferably with the mating faces of the coupling members not in contact.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A junction plate for hydraulic couplings comprising:
   a generally circular plate having a plurality of apertures sized to engage the body of an hydraulic coupling member;
   a cam actuator mounted on the circular plate;
   a drive mechanism comprising a gear train coupled to the cam actuator, and,
   a cam carrier on the periphery of the plate, coupled to the drive mechanism and having at least one cam follower.

2. A junction plate as recited in claim 1 wherein the cam actuator comprises a handle.

3. A junction plate as recited in claim 2 wherein the handle is a T-handle.

4. A junction plate as recited in claim 1 wherein the cam actuator comprises a crank.

5. A junction plate as recited in claim 1 wherein the cam follower is integral with the cam carrier.

6. A junction plate as recited in claim 1 further comprising a handle for manipulating the junction plate.

7. A junction plate assembly for hydraulic couplings comprising:
   a generally circular removable body;
   a cam actuator mounted on the removable body;
   a drive mechanism coupled to the cam actuator;
   a ring gear on the circumference of the removable body engaged with the drive mechanism;
   at least one cam follower on the outer circumference of the ring gear;
   a generally circular fixed plate;
   a generally cylindrical wall having a first end and a second end attached to the fixed plate;
   a generally ring-shaped cam track carrier mounted to the interior circumference of the cylindrical wall proximate the first end; and
   an inclined cam track in the cam track carrier sized to accommodate the cam follower.

8. A junction plate assembly as recited in claim 7 wherein the generally cylindrical wall is integral with the generally circular fixed plate.

9. A junction plate assembly as recited in claim 7 wherein the cam track carrier is integral with the generally cylindrical wall.

10. A junction plate assembly as recited in claim 7 further comprising an entrance slot in the cam track carrier contiguous with the cam track and open at one end to the first end of the cylindrical wall.

11. A junction plate assembly for hydraulic couplings comprising:
    generally circular removable junction plate;
    a shaft rotatably mounted on the removable plate;
    a driver gear attached to the shaft;
    at least one idler gear engaged with the driver gear;
    at least one driven gear engaged with an idler gear;
    a ring gear on the circumference of the removable body engaged with the driven gear;
    at least one cam follower on the outer circumference of the ring gear
    a generally circular fixed junction plate;
    a generally cylindrical wall having a first end and a second end attached to the fixed plate;
    a generally ring-shaped cam track carrier mounted to the interior circumference of the cylindrical wall proximate the first end; and
    an inclined cam track in the cam track carrier sized to accommodate the cam follower.

12. A junction plate assembly as recited in claim 11 further comprising at least one guide pin mounted to the fixed junction plate and at least one receptacle on the removable junction plate for receiving the guide pin.

13. A junction plate assembly as recited in claim 12 wherein the receptacle comprises a hole through the junction plate.

14. A junction plate assembly as recited in claim 11 further comprising at least one guide pin mounted to the removable junction plate and at least one receptacle on the fixed junction plate for receiving the guide pin.

* * * * *